US006014304A

United States Patent [19]

Burnus et al.

[11] Patent Number: 6,014,304

[45] Date of Patent: *Jan. 11, 2000

[54] METHOD OF AND APPARATUS FOR CONTROLLING A PLURALITY OF MUTUALLY COMMUNICATING ACTUATORS

[75] Inventors: Oliver Burnus, Gross Oesingen; Hans Reichmeyer, Grafing, both of Germany

[73] Assignee: STMicroelectronics GmbH, Grasbrunn, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/825,512

[22] Filed: Mar. 31, 1997

[30] Foreign Application Priority Data

Apr. 4, 1996 [DE] Germany .......................... 196 13 590

[51] Int. Cl.[7] ...................................................... H02H 5/04

[52] U.S. Cl. .............................. 361/103; 307/117; 70/264

[58] Field of Search .......................... 361/103; 307/10.1, 307/10.2, 117; 70/264; 701/49

[56] References Cited

U.S. PATENT DOCUMENTS

| | | | |
|---|---|---|---|
| 4,085,979 | 4/1978 | Leiber et al. | 303/92 |
| 4,967,382 | 10/1990 | Hall | 364/557 |
| 5,101,315 | 3/1992 | Ishikawa et al. | 361/24 |
| 5,369,584 | 11/1994 | Kajiwara | 364/424.05 |
| 5,397,923 | 3/1995 | Christensen | 307/9.1 |
| 5,414,416 | 5/1995 | Yamakita et al. | 340/825 |
| 5,762,384 | 6/1998 | Bartel | 292/216 |

FOREIGN PATENT DOCUMENTS

| | | |
|---|---|---|
| 36 28 706 A1 | 2/1988 | Germany . |
| 42 19 212 A1 | 12/1993 | Germany . |
| 4403274A1 | 8/1995 | Germany . |
| 4410583C1 | 8/1995 | Germany . |
| 195 18 306 A1 | 11/1995 | Germany . |
| 195 39 753 | 4/1997 | Germany . |

*Primary Examiner*—Jeffrey Gaffin
*Assistant Examiner*—Kim Huynh
*Attorney, Agent, or Firm*—Theodore E. Galanthay; David V. Carlson; Seed and Berry LLP

[57] ABSTRACT

The invention relates to a method of and an apparatus for controlling a plurality of mutually communicating actuators, each of the actuators having at least one signal sensor for determining the state of the actuator, with at least one control apparatus generating, in accordance with the state of at least one of the actuators, control signals used for driving controllers of the actuators. In order to avoid overheating of the individual actuators or the control apparatus in case of a large number of actuations by a user, it is provided to determine the temperature of the actuators and the control apparatus cooperating with the actuators and, in case a predetermined temperature threshold value is exceeded in an actuator or the control apparatus, to generate a control signal for non-driving the controllers of the actuators until the excessive temperature detected drops below the temperature threshold value by a defined temperature value. Preferably, a safety actuation of the actuators is possible after the temperature threshold value has been exceeded.

36 Claims, 3 Drawing Sheets

METHOD OF AND APPARATUS FOR CONTROLLING A PLURALITY OF MUTUALLY COMMUNICATING ACTUATORS

TECHNICAL FIELD

The present invention relates to a method and an apparatus for controlling a plurality of mutually communicating actuators.

BACKGROUND OF THE INVENTION

German-"Offenlegungsschrift" 36 28 706 A1 discloses a central locking system in which each actuator of the central locking system is connected via a bus system to a central control unit evaluating a plurality of state parameters of doors registered by signal sensors of a plurality of individual actuators. A plurality of state signals are delivered from the signal sensors which are then converted in the central control unit to control signals for controllers of the actuators in accordance with a stored program. These control signals in turn are fed via the bus system to the controllers.

German-"Offenlegungsschrift" DE 42 19 212 A1 describes furthermore a central locking system in which each actuator has a control unit of its own which is fed both with data signals from signal sensors of the actuator and with selected data signals from signal sensors of other remaining actuators in the central locking system. Each control unit retrieves the signal information of the individual signal sensors of its actuator and, on the basis of these data signals and in accordance with selected data signals of the other actuators, calculates control signals for controllers of the central locking system and a theft protection system which are associated with the respective actuator. For transmitting the selected data signals, there is provided a bus system transmitting signals issued by the actuators in a time-division multiplex transmission mode.

Furthermore, German-"Offenlegungsschrift" DE 195 18 306 A1 discloses an apparatus for controlling a plurality of mutually communicating actuators of a convenience control system for motor vehicles. The convenience control system comprises, in addition to a central locking control system for a plurality of doors and a tailgate of a motor vehicle, a control system for a window lifting mechanism, outside mirrors, a lock/unlock switch on a driver's door, an interior illumination system as well as an overall diagnostic system. Each of the system components has an actuator of its own, whose controller is controlled either by a decentralized control unit of its own or directly by a control apparatus communicating with the decentralized control units.

In case of the known central locking or convenience control systems, a rapid temperature increase up to overheating causing a failure of the individual actuators or control units or of the entire system may occur both in the actuators and in the control units due to a large number of actuations primarily by the user.

SUMMARY OF THE INVENTION

According to principles of the present invention, a method of and an apparatus for controlling a plurality of mutually communicating actuators of a central locking or convenience control system are provided by means of which it is possible to prevent overheating of the actuators or a control apparatus in case of a multiplicity of actuations of the actuators.

According to an embodiment of the invention, a temperature of a plurality of individual actuators and/or of a control apparatus cooperating with the actuators is detected. The component (actuator or control apparatus) in which the temperature is measured is dependent upon the temperature sensitivity of the individual components. In case the temperature measured in a component exceeds a first temperature threshold value defined for the particular component, a control signal for non-driving controllers of the mutually communicating actuators is produced until the excessive temperature measured in the actuator or control apparatus has dropped below the first temperature threshold value by a defined temperature value. According to the embodiment of the invention, all controllers belonging to a functional group, for example the actuators of a central locking means, are not driven or operated until the temperature of the corresponding component has dropped below the first temperature threshold value by the defined temperature value.

According to a further embodiment of the invention, a safety actuation is permitted for each actuator while the first temperature threshold value is exceeded in a component. In the case of a central locking system, unlocking of the doors is still possible.

A further embodiment of the invention provides that a second temperature threshold value is defined having a value lower than that of the first temperature threshold value. When the second temperature threshold value is exceeded in an actuator or a control apparatus, a warning signal is generated and possibly displayed. It may be provided, furthermore, that the control of the controllers of the actuators is modified in response to the warning signal. In this respect, a possibility consists in increasing the time intervals between the control signals used for driving the controllers of the actuators.

The temperature is preferably detected directly in the control apparatus, for example by means of a temperature sensor implemented in the control apparatus. The temperature measurement in the actuators can be made by determining the number of actuations per unit of time.

An advantage of the embodiments of the invention resides especially also in that, when the temperature is exceeded in a component (actuator or control apparatus), not only the individual actuator is non-operable, but the entire functional system is put out of operation synchronously for a specific period of time, except for a permissible safety actuation. The vehicle user thus does not have the impression that a failure of the individual actuator is involved.

BRIEF DESCRIPTION OF THE DRAWINGS

The invention will now be elucidated in more detail by way of an embodiment with reference to the associated drawings wherein.

DETAILED DESCRIPTION OF THE INVENTION

Figure 1:
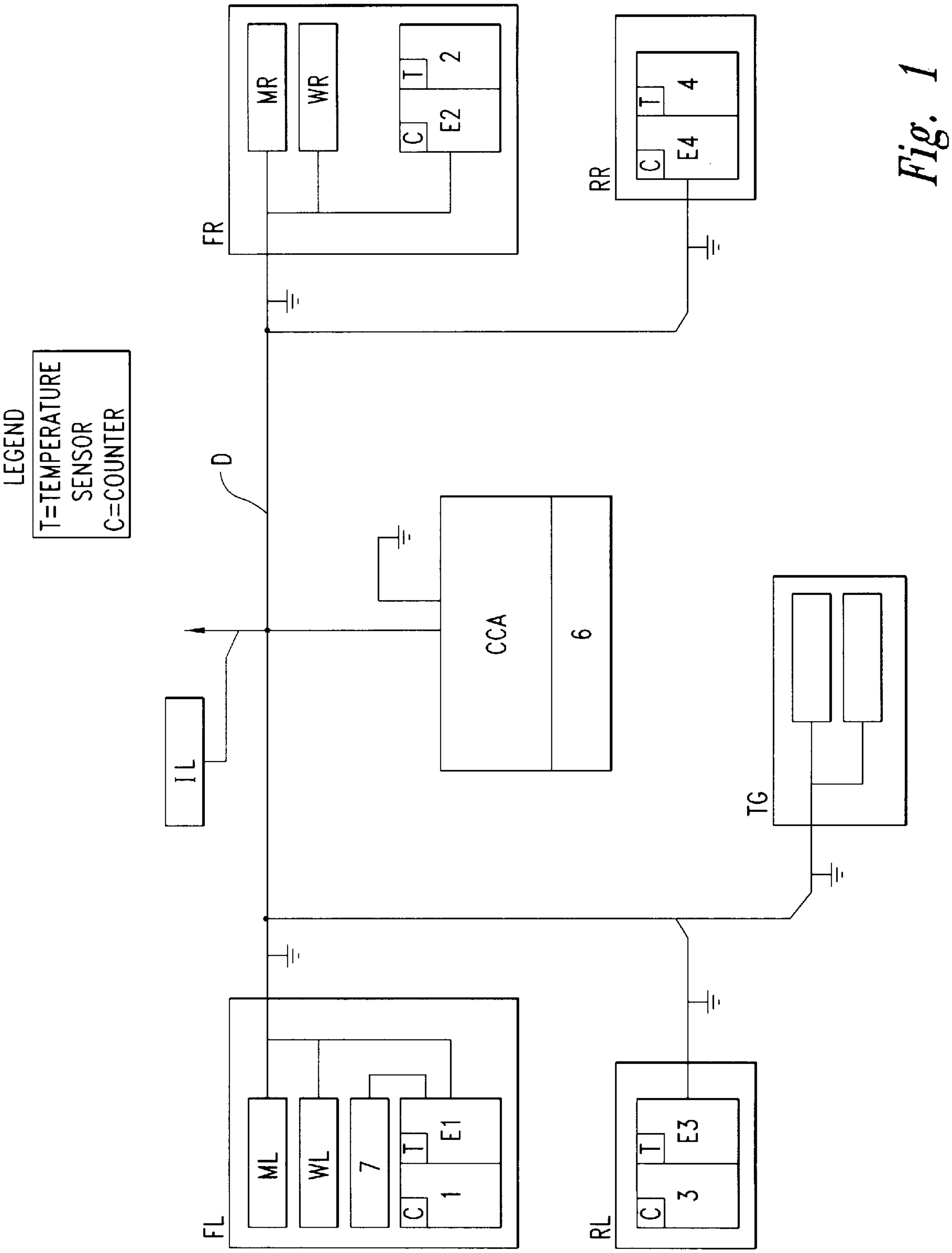
FIG. 1 is a block diagram of a convenience control system of a motor vehicle according to an embodiment of the invention.

A convenience control system according to an embodiment of the invention is shown in FIG. 1 containing a central locking system for a plurality of doors FL, FR, RL, RR and a tailgate TG, a control system for two window lifting mechanisms WL, WR, a control system for right and left outside mirrors ML, MR, a control system for a lock/unlock switch 7 on the door FL, an interior illumination IL as well as an overall diagnostic system. Each of the system components has an actuator of its own (FIG. 1 shows only actuators 1 to 4 of the central locking circuit), a controller of which is controlled either by a decentralized control apparatus E1 to E4 or directly by a central control apparatus CCA, with the lock/unlock switch 7 in the instant case being also controlled via the control apparatus E1. A data exchange between the control apparatus E1 to E4 and the central control apparatus CCA, in the embodiment, takes place via a bus system D, with each control apparatus E1 to E4 sending information under a specific identification to the central control apparatus CCA. The latter in turn transmits its data in the form of electrical transmissions associated with the individual actuators to the control apparatus E1 to E4. A temperature sensing circuit T determines the temperature in the control apparatus. The control apparatus CCA delivers an inhibiting signal to each of the controllers E1 to E4 to interrupt the movement of the actuators 1 to 4 when the temperature of any of the actuators or the control apparatus exceeds a first temperature threshold value.

Figure 2:
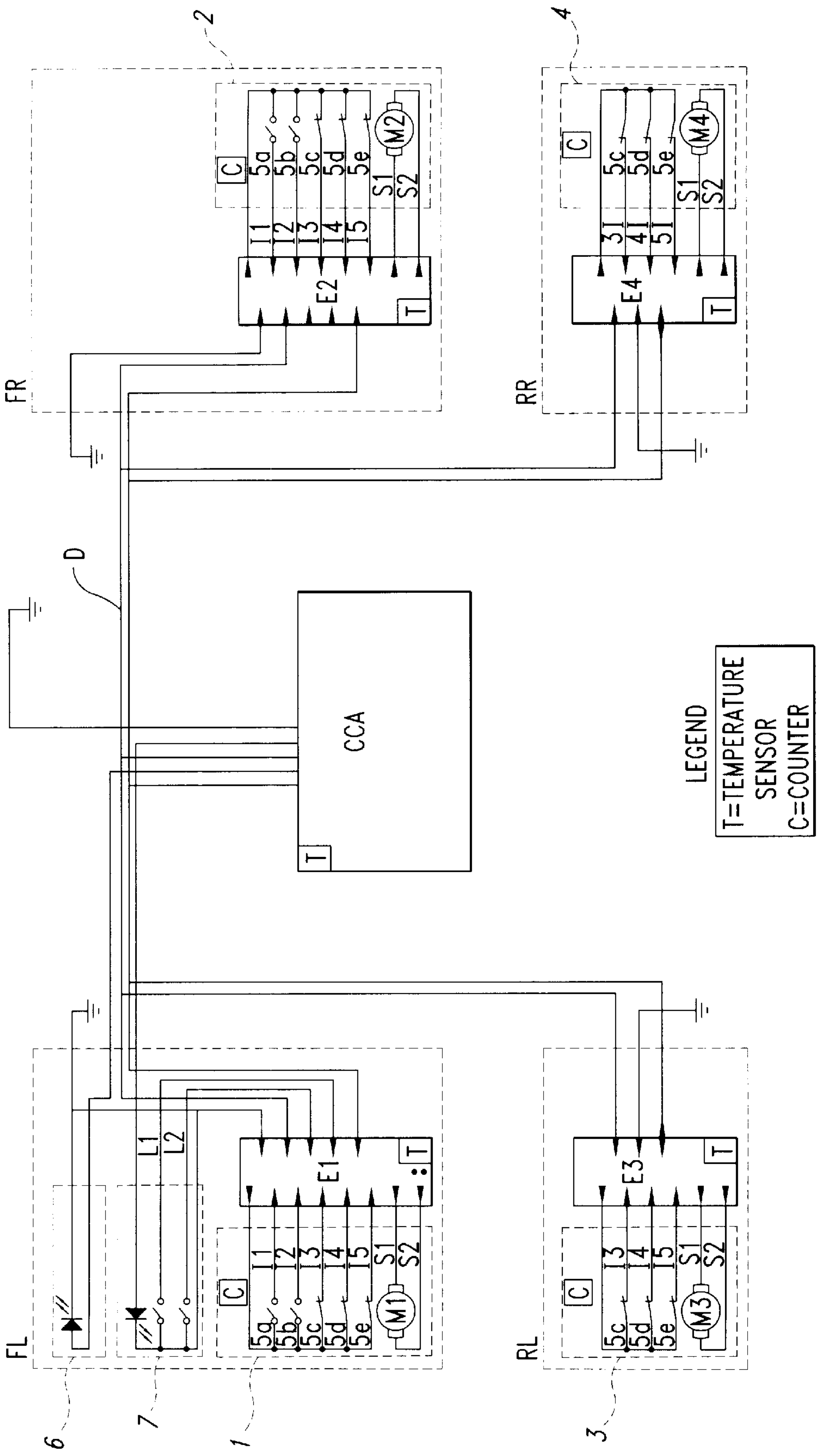
FIG. 2 is a block diagram of a central locking system according to an embodiment of the invention.

In FIG. 2, an embodiment of the invention is illustrated by way of a control of the central locking system for the individual doors. Each of the doors FL, FR, RL, RR is provided with an electrically or pneumatically driven actuator 1 to 4 designed as a door lock and with the control apparatus E1 to E4 communicating with each other and with the central control apparatus CCA via the bus system D. Each of the actuators 1 to 4, depending on its site of use, has a different number of signal sensors 5*a*–5*e*. The signal sensors 5*a* of actuators 1 and 2 each supply a state signal 11 "open system" and the signal sensors 5*b* a state signal 12 "close system" to the control apparatus E1 and E2, respectively. They thus serve for control of the central locking system by a user. The signal sensors 5*c* and 5*d* of the actuators 1 to 4 each issue a state signal 13, 14 indicating whether the respective door is open or closed. The signal sensors 5*e* indicate whether a theft protection mechanism is activated through a state signal 15. The doors RL and RR have the actuators 3 and 4 that may not be operated by a user. For this reason, the corresponding signal sensors 5*a* and 5*b* are missing there. All signal sensors 5*a*–5*e* are provided in the form of Hall sensors or microswitches. Each of the control apparatus E1 to E4 of the actuators 1 to 4 continuously receives the state signals 11 to 15 of its own signal sensors 5*a*–5*e* as well as state information from other actuators via control apparatus of the latter and calculates therefrom a plurality of control signals S1, S2 for driving a plurality of motors M1 to M4 associated therewith. In addition thereto, all state signals 11 to 15 are also fed to the central control apparatus CCA which controls further functions, not shown, and is connected to a state display 6. The transmission of the state signals 11 to 15 between the control apparatus E1 to E4 and the central control apparatus CCA takes place in time-division multiplex transmission mode, with the central control apparatus CCA controlling the data traffic on the bus system D. In addition to the actuators 1 to 4, the control apparatus E1 to E4 may also control further actuators. For example, FIG. 2 shows a lock/unlock switch 7 on the door FL, the control of which is taken over by the control apparatus E1 via two additional electrical connections L1 and L2.

Figure 3:
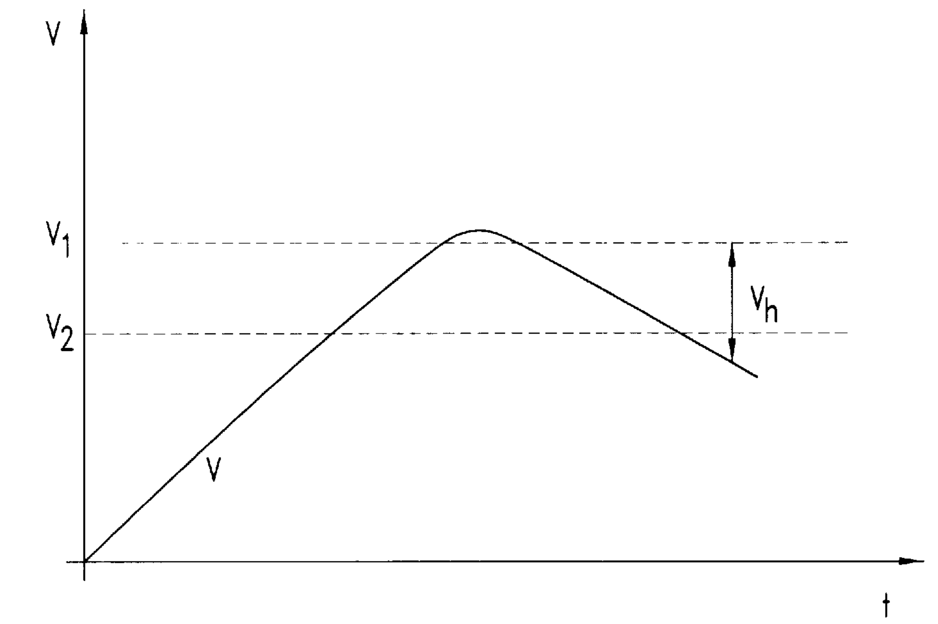
FIG. 3 shows a possible pattern of the temperature in a control apparatus according to an embodiment of the invention.

Due to a multiplicity of actuations of the individual actuators 1 to 4 effected by the user in a short period of time, overheating of individual actuators or control apparatus and in the extreme case failure of these components may occur. For avoiding overheating of the individual actuators 1 to 4 or the control apparatus E1 to E4, the temperature $\vartheta$ of these components is detected. This may take place in the control apparatus E1 to E4 via temperature sensors T implemented therein. When the temperature $\vartheta$ of one of the control apparatus E1 to E4 exceeds a lower temperature threshold value $\vartheta_2$ shown in FIG. 3, the control apparatus produces a warning signal which is communicated via the bus system D to all the other control apparatus E1 to E4. Due to the warning signal, the control signals S1 and S2 driving the motors M1 to M4 of the actuators 1 to 4 are modified such that the time interval between the driving operations of the actuators is increased. If the temperature $\vartheta$ in one control apparatus, e.g., E1, nevertheless exceeds an upper temperature threshold value $\vartheta_1$, a signal is fed to all the control apparatus E1 to E4 on the basis of which the actuators 1 to 4 are not driven until the temperature in control apparatus E1 has dropped below the upper temperature threshold limit $\vartheta_1$ by a defined temperature value $\vartheta_h$ However, while the upper temperature threshold limit value $\vartheta_1$ is exceeded, it is still possible for safety reasons to operate the actuators once in order to be able to open the doors if necessary.

Figure 4:
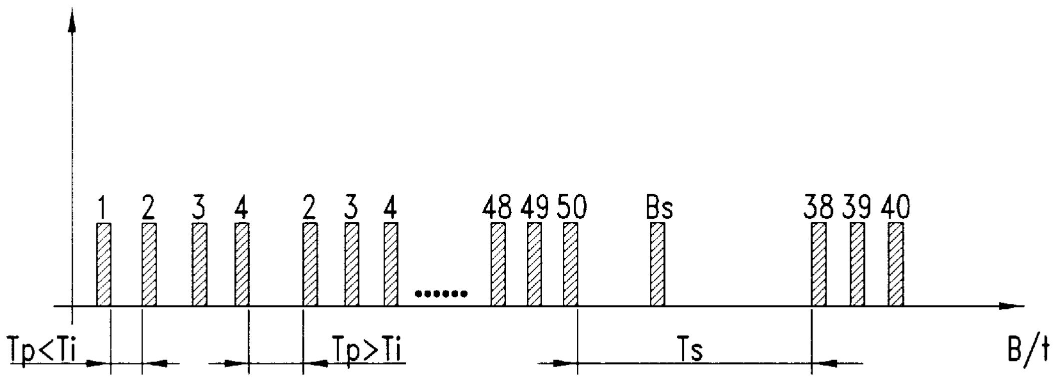
FIG. 4 shows a temperature detection via a number of actuations in an actuator according to an embodiment of the invention.

With respect to the actuators 1 to 4, the temperature may be determined by way of a detection of the number of actuations B per unit of time t. To this end, each actuator 1 to 4 has an actuation counter, C associated therewith, which is provided in the control apparatus E1 to E4. The actuation counter is incremented upon each actuation of the lock/unlock switch 7 when the time interval $T_p$ between actuations is smaller than a predetermined value $T_i$. When the time interval $T_p$ is above the value $T_i$, the actuation counter is decremented, in the embodiment shown in FIG. 4, by 2. When the actuation counter reaches the FIG. 50, the actuators 1 to 4 are not driven for a defined period of time $T_s$. However, one single safety actuation $B_s$ "unlocking" is permitted. In this period of time $T_s$, the actuation counter is decremented by 12, and driving of the actuators 1 to 4 is released again after expiration of the time period $T_s$.

What is claimed is:

1. A method for controlling a plurality of mutually communicating actuators, each of the actuators being driven by a respective controller, each of the controllers receiving a control signal from a control apparatus and driving a respective one of the actuators to move in response to the control signal, the method comprising:

generating a state signal from a signal sensor in each actuator, the state signal indicating a state of the actuator;

providing the state signal from each actuator to the control apparatus, the control apparatus generating the control signals in response to the state signals;

individually sensing a temperature in each of the actuators and in the control apparatus;

generating an inhibiting signal if any of the individually sensed temperatures exceeds a first temperature threshold value; and preventing each actuator from moving in response to the inhibiting signal until each of the individually sensed temperatures falls below the first temperature threshold value by a selected temperature increment.

2. The method of claim 1, further comprising permitting a single safety operation of each of the actuators during the generation of the inhibiting signal.

3. The method of claim 1, further comprising generating a warning signal if any of the individually sensed temperatures exceeds a second temperature threshold value, the second temperature threshold value being less than the first temperature threshold value; and modifying the control signals generated by the control apparatus in response to the generation of the warning signal to limit the frequency of actuator movements.

4. The method of claim 1 wherein individually sensing a temperature comprises:

sensing a temperature in the control apparatus; and individually determining a temperature of each actuator according to a count of movements of each actuator in a unit of time.

5. The method of claim 1, wherein the actuators are controlled by a centralized control apparatus.

6. The method of claim 1, wherein the actuators are controlled by a plurality of decentralized control apparatus.

7. An apparatus for controlling a plurality of mutually communicating actuators comprising:

a plurality of controllers, each controller driving a respective one of the actuators;

a control apparatus generating a plurality of control signals, each control signal being received by a respective one of the controllers, each actuator being driven to move in response to one of the control signals;

a signal sensor located in each actuator, each signal sensor detecting a state of its respective actuator and generating a state signal, the control apparatus generating the control signals in response to the state signals; and a plurality of temperature sensing circuits individually determining the temperature in an associated one of the actuators and the control apparatus, the control apparatus delivering an inhibiting signal to one of the plurality of controllers to interrupt the movement of the actuator associated with that controller if the temperature of either that actuator or the control apparatus exceeds a first temperature threshold value.

8. The apparatus of claim 7, further comprising circuitry providing a plurality of control signals for driving the actuators during the delivery of the inhibiting signals for at least one safety movement.

9. The apparatus of claim 7 wherein the control apparatus delivers a warning signal to each of the controllers if the temperature of either any of the actuators or the control apparatus exceeds a second temperature threshold value, the second temperature threshold value being less than the first temperature threshold value.

10. The apparatus of claim 9 wherein the control apparatus modifies the control signals in response to the warning signal to limit the frequency of actuator movements.

11. The apparatus of claim 7 wherein the temperature sensing circuits comprise counting circuitry for counting movements of each actuator in a unit of time.

12. The apparatus of claim 7 wherein one of the temperature sensing circuits includes a temperature sensor in the control apparatus.

13. The apparatus of claim 7, wherein the actuators are under control of a centralized control apparatus.

14. The apparatus of claim 7, wherein the actuators are under control of a plurality of decentralized control apparatus.

15. The apparatus of claim 7 wherein the control apparatus delivers the inhibiting signal to each of the controllers to interrupt the movement of the actuators if the temperature of either any of the actuators or the control apparatus exceeds the first temperature threshold value.

16. A method of controlling a plurality of mutually communicating actuators, each of said actuators having at least one signal sensor for detecting a state of the actuator, with at least one control apparatus generating control signals in accordance with the state of at least one of the actuators, which are used for driving controllers of the actuators, comprising:

individually determining a temperature of the actuators or of the control apparatus; and if a defined first temperature threshold value in one of the plurality of actuators is exceeded, generating a control signal for inhibiting that overheated actuator until the temperature in that actuator has dropped below the first temperature threshold value by a defined temperature value.

17. The method according to claim 16, further comprising generating a control signal for inhibiting the controllers if the first temperature threshold value in either any of the actuators or the control apparatus is exceeded.

18. The method according to claims 16 or 17, further comprising allowing a single safety actuation of each of the actuators during the period of time in which the first temperature threshold value is exceeded in either at least one actuator or the control apparatus.

19. The method according to claim 16, further comprising:

defining a second temperature threshold value having a lower value than that of the first temperature threshold value; and generating a warning signal if the second temperature threshold value is exceeded in either one of the actuators or the control apparatus.

20. The method according to claim 19, further comprising modifying the control signals for driving the controllers of the actuators in accordance with said warning signal.

21. The method according to claim 20, further comprising increasing time intervals between the control signals used for driving the controllers of the actuators in accordance with said warning signal.

22. The method according to claim 16, further comprising measuring the temperature of the control apparatus directly in the control apparatus.

23. The method according to claim 16, further comprising:

determining a number of actuator actuations per unit of time; and using the number of actuator actuations per unit of time to effect the temperature determination in the actuators.

24. The method of claim 16, further comprising if the defined first temperature value in either one actuator or in the control apparatus is exceeded, generating the control signal for inhibiting a plurality of the actuators until the temperature in either that actuator or the control apparatus has dropped below the first temperature threshold value by the defined temperature value.

25. An apparatus comprising:

at least one control apparatus controlling a plurality of mutually communicating actuators, each of said actuators having at least one signal sensor for detecting a state of the actuator, the control apparatus generating control signals in accordance with the state of at least one of the actuators, which drive controllers of the actuators; and a plurality of temperature detecting circuits to individually detect the temperature of an associated actuator or of the control apparatus which, if a defined first temperature threshold value in either one of the plurality of actuators or the control apparatus is exceeded, the control apparatus generates a control signal to inhibit the controllers until the temperature in either that actuator or the control apparatus has dropped below the first temperature threshold value by a defined temperature value.

26. The apparatus according to claim 25 wherein, if the first temperature threshold value in either one of the plurality of actuators or the control apparatus is exceeded, a control signal for inhibiting the controllers of the actuators belonging to a functional group is generated.

27. The apparatus according to claims 25 or 26 wherein a single safety actuation of each of the actuators is possible during the period of time in which the first temperature threshold value is exceeded in either at least one actuator or the control apparatus.

28. The apparatus according to claim 25 wherein a warning signal is generated if a second temperature threshold value is exceeded in either one of the actuators or the control apparatus, the second temperature threshold value being lower than the first temperature threshold value.

29. The apparatus according to claim 28 wherein the control signals for driving the controllers of the actuators are modified in accordance with said warning signal.

30. The apparatus according to claim 29 wherein time intervals between the control signals used for driving the controllers of the actuators are increased in accordance with said warning signal.

31. The apparatus according to claim 25 wherein the temperature detecting circuits to individually detect the temperature in the control apparatus comprise at least one temperature sensor for directly measuring the temperature in the control apparatus.

32. The apparatus according to claim 25 wherein the temperature detecting circuits to detect the temperature in the actuators comprise a means for determining a number of actuator actuations of each actuator per unit of time.

33. An apparatus comprising:

a plurality of actuators;

a plurality of controllers each coupled to a corresponding one of the actuators;

a control apparatus coupled to the controllers;

a plurality of temperature sensors respectively associated to the plurality of actuators and to the control apparatus; and a means for controlling the plurality of controllers coupled to the temperature sensors, the control means inhibiting actuator activation if one of the plurality of temperature sensors individually senses that a defined temperature in either an associated actuator or the control apparatus is exceeded and thereafter allowing actuator activation if that temperature sensor individually senses that temperature drops below the defined temperature by a defined amount, the control means allowing a single safety actuator activation if that temperature sensor individually senses that the defined temperature is exceeded and before that temperature sensor individually senses that temperature has dropped below the defined temperature by the defined amount.

34. The apparatus of claim 33, wherein the control apparatus comprises a central controlling apparatus.

35. The apparatus of claim 33, wherein the plurality of controllers comprises a plurality of decentralized controlling apparatus.

36. The apparatus of claim 33, wherein the control apparatus comprises a centralized control apparatus coupled to a plurality of decentralized control apparatus, with the control apparatus controlling each of the controllers.

* * * * *